United States Patent [19]
Hoyes et al.

[11] Patent Number: 6,020,276
[45] Date of Patent: *Feb. 1, 2000

[54] SEAL MATERIAL

[75] Inventors: John R Hoyes, Littleborough; Michael Bulmer; Liam C Thorpe, both of Rochdale, all of United Kingdom

[73] Assignee: Flexitallic Investments, Inc., Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/810,381

[22] Filed: Mar. 3, 1997

[30] Foreign Application Priority Data

Mar. 6, 1996 [GB] United Kingdom .................... 9604757

[51] Int. Cl.[7] .................................................. D03D 25/00
[52] U.S. Cl. ........................... 442/185; 442/186; 442/265; 442/304
[58] Field of Search ............................. 428/289; 442/185, 442/186, 265, 304

[56] References Cited

U.S. PATENT DOCUMENTS

| | | |
|---|---|---|
| 4,705,722 | 11/1987 | Ueda et al. . |
| 4,949,620 | 8/1990 | Swan et al. . |
| 5,225,262 | 7/1993 | Leduc . |
| 5,240,769 | 8/1993 | Ueda et al. . |
| 5,549,306 | 8/1996 | Ueda . |

FOREIGN PATENT DOCUMENTS

| | | |
|---|---|---|
| 0 482 489 A1 | 4/1992 | European Pat. Off. . |
| 2 243 883 | 11/1991 | United Kingdom . |
| 2 285 067 | 6/1996 | United Kingdom . |

OTHER PUBLICATIONS

Derwent WPI Abstract Accession No. 92–083762/11 & JP 040025671 Nippon Pillar Feb. 9, 1992.
Derwent WPI Abstract Accession No. 92–036218/05 & JP 030281592A Nippon Valoua Dec. 12, 1991.
Derwent WPI Abstract Accession No. 94–164227/20 & JP 060108037 A Nippon Valqua Apr. 19, 1994.
Derwent WPI Abstract Accession No. 92/343332/42 & JP 040245942 A Shinsozai Sep. 2, 1992.

*Primary Examiner*—Jenna Davis
*Attorney, Agent, or Firm*—Winstead Sechrest & Minick P.C.

[57] ABSTRACT

A material stock from which seals and packings may be formed is described; the material stock being relatively soft and compressible and cross section having a construction comprising a plurality of interlaced, as hereinbefore defined, flat section tapes having associated therewith a reinforcement. The tapes may include exfoliated graphite, paper, PTFE, mica, vermiculite as appropriate. The seal stock may have any desired cross sectional shape.

45 Claims, 1 Drawing Sheet

SEAL MATERIAL

The present invention relates to a material for the manufacture of seals and/or packings.

Seals and packings for valve stems for example have traditionally been made from relatively hard plaited materials such as yarns of glass fibre, aramid fibre carbon fibre, exfoliated graphite, polytetrafluoroethylene (PTFE) and asbestos impregnated with various sealants and/or lubricant substances such as PTFE, graphite, plastics or rubber resins and molybdenum disulphide for example. The plaiting process as currently employed uses generally round yarns or fibres and produces a relatively dense, hard stock material from which for example the seals for the stuffing box for the stem of a steam valve may be made. The stock material is pressed under high pressure in a compacting die to produce a relatively very hard seal which is accurately sized to the particular application in which it is to be used. Such seals are very efficient in operation but because of the high accuracy with which they must be formed, their inherent hardness and the large number of different sizes which must be held for emergency repair of valves of many different sizes and configurations, they are costly in terms of held inventory for the user.

U.S. Pat. No. 5,240,769 describes a packing material made by plaiting a plurality of yarns of flexible graphite strips having a reinforcing fibre associated therewith. The graphite strips must be less than 5 mm in width to allow twisting of the yarns without breakage to form essentially round yarns which are then plaited or knitted together to form the packing material which may be cut to a specific length, corresponding to a shaft circumference for example, to form a gland packing for example. However, due to the twisting of the individual yarns, the resulting plaited packing is still relatively hard and of high density as evidenced by the fact that the material may be cut to a specific length and used as a gland packing substantially without further compressing as in a die. Packings formed from such material are not so efficient in sealing ability as traditional die pressed or 'blocked' seals.

It is an object of the present invention to provide a stock material from which seals and packings may be made by a user particularly, though not exclusively in maintenance and/or emergency repair situations, but which stock material is amenable to the formation of a range of seal and packing sizes from a single size of material stock.

According to a first aspect of the present invention, there is provided a material stock from which seals and packings may be formed, the material stock being relatively soft and compressible comprising a plurality of interlaced flat section tapes each of width greater than 6 mm and each having a reinforcement associated therewith.

In this specification, the term "interlaced" is to be interpreted to include methods of construction including braiding, plaiting, knitting and weaving or any other suitable form of intertwining or winding.

Where plaiting is used as the constructional method, any known variations of the technique may be employed such as, for example, those known by those skilled in the art as 2-track, seam plait, 3-track, 4-track and any others consistent with the stresses on the tape being such as to allow plaiting.

The material stock may be of any desired cross sectional shape including rectangular, square, oval, round or otherwise polygonal.

The tape may comprise one or more of a wide variety of materials including exfoliated graphite, vermiculite, polycarbon, graphite, PTFE, low density or expanded PTFB, filled PTFEs, mica, ceramic fibre tapes and various papers including graphite filled paper, cellulose based gasket papers, so-called automotive gasket paper for example.

Preferably, the width of the tape may be greater than 6 mm, or more preferably, about 8 mm or more wide.

One function of the associated reinforcement is to increase the strength of the tape in the axial direction. The reinforcement may be any which is consistent with properties which it is desired to achieve with regard to friction, wear and strength or any combination of these properties. Suitable reinforcements may include elements such as metal wires, ribbons or threads, plastics material filaments, yarns, tapes or threads or yarns, threads or tapes of natural materials such as cotton for example and, of man made and/or inorganic fibrous materials such as, for example, carbon, glass, silica and ceramic.

The method of reinforcement may include linear elements which are parallel to the axial direction of the tape and for example wound off of the same spool during a braiding or plaiting process to form the material stock.

The reinforcement may be embedded into the surface or body of the tape.

The reinforcement may comprise a surface coating of a plastics material for example deposited on one or more faces of the tape.

The reinforcement may comprise a layer of a plastics material for example laminated on to the tape.

The reinforcement may be provided as an element formed around the tape by overknitting or winding. For example, the reinforcement may be an overknitted web of a fine, corrosion resistant metallic wire such as brass, bronze or a nickel-based alloy such as Inconel (trade name). Alternatively, the reinforcement may comprise a plastics material selected for its strength and frictional properties such as polyetheretherketone (PEEK) or PTFE for example.

The reinforcement may comprise more than one type of reinforcing material and/or more than one method of application thereto.

The reinforcement may comprise or include an element incorporated into the material stock as a central core or one or more of the plaited members of the construction.

Because the material stock mainly comprises for its bulk the constituent tape material, the overall density is relatively low. The tape is not deliberately folded or twisted prior to production of the material stock so as to maintain a high surface area to volume ratio.

Conventional hard compacted plaited or braided exfoliated graphite material has a density above 1.0 g/cc, frequently in the region of about 1.4–1.8 g/cc. However, the density of the material stock of the present invention, when made from exfoliated graphite tape, is substantially below 1.0 g/cc. The density of the material stock of the present invention may be controlled by factors such as the cross sectional aspect ratio of the tape, i.e. width to thickness ratio.

In spite of its low density, the material stock of the present invention is very strong due to the incorporated reinforcement which is an integral part of the stock construction and is present throughout the body thereof One factor which has prevented soft exfoliated graphite seal material from being used in the past has been the low resistance to extrusion of the material through small gaps which necessarily exist due to normal machining tolerances between for example a valve stem shaft and a packing retaining collar. Over a period of time, soft material extrudes through such small gaps due to the applied pressure and eventually causes leakage of the fluid being sealed. The material stock of the present invention, although soft and compressible, is resistant to such extrusion due to the inclusion of the reinforcement as an integral part of the construction. Indeed, the application of pressure from the fluid being sealed on the material stock of the present invention tends to cause the material to improve its sealing capability with time as it becomes compacted into the entry of any gaps created by machining tolerances. Thus, due to its inherent softness and compressibility, a single size of material stock may be compressed to form an efficient seal over a relatively wide range of required seal sizes.

A length of seal material stock perhaps corresponding to two or more turns of the relevant stem or shaft circumference may be employed thereby removing a potential leakage source at the butt ends of a single turn. Alternatively, two or more single pieces may be employed having radially offset butt joints.

Due to the low density of the material stock of the present invention it may be easily impregnated with lubricant, sealant or adhesive material such as for example PTFE, graphite, molybdenum disulphide and silicone compounds, plastics resins and rubbers. Where the material stock of the present invention is to be used in applications where rotational sliding such as in rotary seals or bearings, in addition to or instead of static sealing, axial or reciprocating motion occurs, heat dissipation as well as lubricity may be a desirable feature of the material stock. In these circumstances, a graphite tape overknitted with PTFE and/or PEEK may be particularly beneficial.

Seal material stock comprising mica or vermiculite tape may be particularly useful in sealing or packing applications at high temperatures where graphite based tapes may be susceptible to degradation by oxidation or chemical attack for example.

Where the seal stock material is plaited, for example, it may further include a central core to provide bulk and/or additional strength. However, such a central core may itself be relatively soft and compressible such as, for example, a relatively loose knitted or plaited glass fibre textile material. Furthermore, the plurality of plaited or otherwise intertwined tape members formed around the core may still retain a high surface area to volume ratio to retain compressibility thereof According to a second aspect of the present invention, there is provided a seal ring when made from the seal stock of the first aspect of the present invention.

Seal rings may be of any desired cross-sectional shape even though different from the cross-section of the seal stock material from which they are made. For example, a non-square, rectangular section seal ring may be made from a square section seal stock material due to the inherent conformability thereof.

In order that the present invention may be more fully understood, an example will now be described by way of illustration only with reference to the accompanying drawings, of which:

Figure 1:
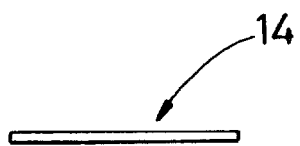
FIG. 1 shows a cross section of an exfoliated graphite tape used in the construction of a material stock according to the present invention.
Figure 2:
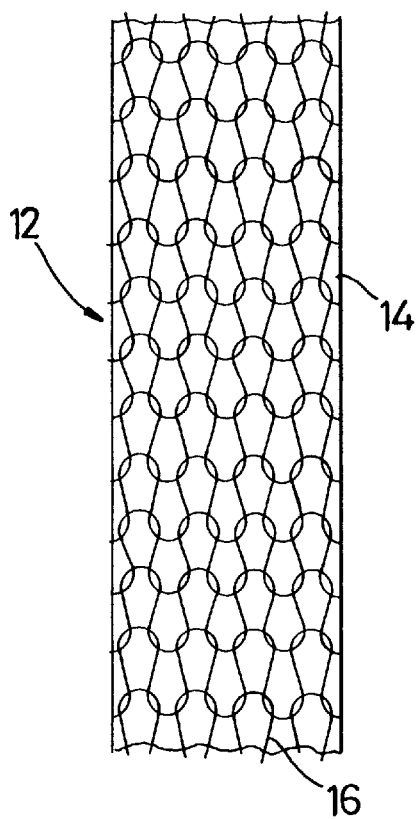
FIG. 2 shows a schematic plan view of a piece of exfoliated graphite tape having an overknitted reinforcement; and, FIG. 3 which shows a schematic elevation view of one face of a plaited material stock according to the present invention.
Figure 3:
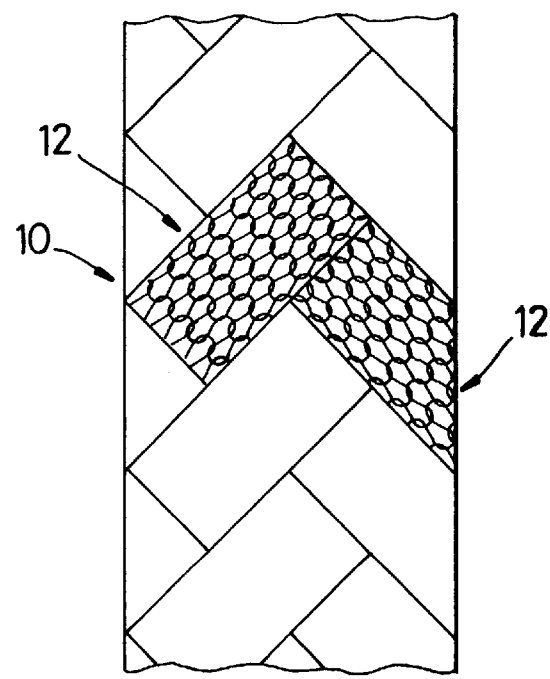

Referring now to the drawings and where the same features are denoted by common reference numerals. A soft compressible material stock for the manufacture of seals and packings is shown generally at 10 and is manufactured by plaiting on a 2-track plaiting machine of eight tapes 12 of reinforced exfoliated graphite with one centre tape to produce a substantially square section of about 10 mm side. Each tape 14 has a density of about 1.2 g/cc and is approximately 8 mm wide and about 0.5 mm in thickness and is overknitted with a web of Inconel (trade name) wire 16 of 0.09 mm diameter. For the sake of clarity, FIG. 3 shows only two of the reinforced tapes 12 having the reinforcement drawn in. Thus, the material stock is formed having the Inconel wire present throughout the body of the material stock. The density of the material stock 10 is about 0.64 g/cc calculated from the overall dimensions thereof. Due to its low density and complaint, compressible nature, the material stock may be used to form an emergency packing in the stuffing boxes of valves wherein it may be compressed to fill the space available. The overknitted web of wire 16 prevents extrusion of the material through any machining tolerance gaps which may be present.

We claim:

1. A material stock from which seals and packings may be formed, the material stock being relatively soft and compressible and having a density below 1.0 g/cc, wherein the material stock comprises a plurality of substantially flat section tapes that are interlaced together whereby both sides of each tape contact adjacent tapes, each tape of said plurality having a width greater than 6 mm and a reinforcement associated therewith.

2. A material stock according to claim 1 wherein the interlaced construction is a plaited construction.

3. A material stock according to either claim 1 wherein the tape is selected from a least one of the group comprising: exfoliated graphite, vermiculite, polycarbon, graphite, PTFE, low density or expanded PTFE, filled PTFEs, mica, ceramic fibre tapes and papers including graphite filled paper, cellulose based gasket papers, automotive gasket paper.

4. A material stock according to claim 1 wherein said reinforcement is selected from at least one of metal wires or threads, plastics material filaments, yarns, tapes or threads or yarns, threads or tapes of natural materials such as cotton, yarns, thread or tapes of man-made fibrous materials including glass, carbon, ceramic or silica.

5. A material stock according to claim 1 wherein said reinforcement is a linear element which is generally parallel to the axial direction of the tape.

6. A material stock according to claim 1 wherein the reinforcement is embedded in the graphite tape.

7. A material stock according to claim 1 wherein the reinforcement comprises a surface coating of a polymeric material deposited on one or more faces of the tape.

8. A material stock according to claim 1 wherein the reinforcement comprises a layer of a plastics material laminated on to the tape.

9. A material stock according to claim 1 wherein the reinforcement is provided around the tape by overknitting.

10. A material stock according to claim 9 wherein the reinforcement comprises an overknitted web of a fine metallic wire.

11. A material stock according to claim 9 wherein the reinforcement comprises a plastics material or inorganic, fibrous material.

12. A material stock according to claim 2 wherein there is reinforcement comprising at least one of the plaited elements.

13. A material stock according to claim 2 including a centre core of textile yarn of knitted, plaited or braided construction.

14. A material stock according to claim 1 wherein it is impregnated with lubricant material.

15. A material stock according to claim 1 having a cross sectional shape selected from the group comprising rectangular, square, round, oval and polygonal.

16. A seal or packing ring made from the material stock according to claim 1.

17. A seal or packing ring according to claim 15 wherein the seal or packing ring cross section is of different shape to that of the material stock from which it is made.

18. A material sock for seals and packings comprising:
   a plurality of tapes each tape of said plurality having a substantially flat, rectangular cross-sectional shape and having a width dimension greater than 6 mm, wherein said tapes are interlaced together whereby both sides of each tape contact adjacent tapes and such that a density of said interlaced plurality of tapes does not exceed 1.0 g/cc; and
   a reinforcement associated with each of said tapes.

19. The material stock of claim 18, wherein said plurality of tapes are interlaced in a plaited construction.

20. The material stock of claim 18, wherein material for said tapes is selected from the group consisting of at least one of the following: exfoliated graphite, vermiculite, polycarbon, graphite, PTFE, low density PTFE, expanded PTFE, filled PTFEs, mica, ceramic fiber tapes, graphite filled paper, cellulose based gasket papers, and automotive gasket paper.

21. The material stock of claim 18, wherein said reinforcement is selected from the group consisting of at least one of the following: metal wires, metal threads, plastics material filaments, cotton filaments, glass filaments, carbon filaments, ceramic filaments, and silica filaments.

22. The material stock of claim 18, wherein said reinforcement is a linear element with a longitudinal axis that is substantially parallel to a bilateral axis of a tape of said plurality of tapes.

23. The material stock of claim 18, wherein said reinforcement is embedded in a tape of said plurality of tapes.

24. The material stock of claim 18, wherein said reinforcement further comprises a surface coating of a polymeric material on at least one face of each tape of said plurality of tapes.

25. The material stock of claim 18, wherein said reinforcement further comprises a layer of a plastics material secured to an external surface of each tape of said plurality of tapes.

26. The material stock of claim 18, wherein said reinforcement is overknitted about each tape of said plurality tapes.

27. The material stock of claim 26, wherein said reinforcement further comprises a fine metallic wire having a longitudinal axis that is substantially parallel to a bilateral axis of a tape of said plurality of tapes.

28. The material stock of claim 26, wherein said reinforcement further comprises a plastics material or inorganic, fibrous material.

29. The material stock of claim 19, further comprising:
   a center core of textile yarn having a knitted, plaited or braided construction.

30. The material stock of claim 18, wherein each tape of said plurality of tapes is impregnated with lubricant material.

31. The material stock of claim 18, wherein said interlaced plurality of tapes have a generally rectangular cross-sectional shape.

32. A seal or packing ring comprising:
   a plurality of tapes, each tape of said plurality having a substantially rectangular cross-sectional shape and having a width dimension greater than 6 mm, wherein said tapes are interlaced together such that a density of said interlaced plurality of tapes does not exceed 1.0 g/cc; and
   a reinforcement associated with each of said tapes.

33. The seal of claim 32, wherein said plurality of tapes are interlaced in a plaited construction.

34. The seal of claim 32, wherein material for said tapes is selected from the group consisting of at least one of the following: exfoliated graphite, vermiculite, polycarbon, graphite, PTFE, low density PTFE, expanded PTFE, filled PTFEs, mica, ceramic fiber tapes, graphite filled paper, cellulose based gasket papers, and automotive gasket paper.

35. The seal of claim 32, wherein said reinforcement is selected from the group consisting of at least one of the following: metal wires, metal threads, plastics material filaments, cotton filaments, glass filaments, carbon filaments, ceramic filaments, and silica filaments.

36. The seal of claim 32, wherein said reinforcement is a linear element with a longitudinal axis that is substantially parallel to a bilateral axis of a tape of said plurality of tapes.

37. The seal of claim 32, wherein said reinforcement is embedded in a tape of said plurality of tapes.

38. The seal of claim 32, wherein said reinforcement further comprises a surface coating of a polymeric material on at least one face of each tape of said plurality of tapes.

39. The seal of claim 32, wherein said reinforcement further comprises a layer of a plastics material secured to an external surface of each tape of said plurality of tapes.

40. The seal of claim 32, wherein said reinforcement is overknitted about each tape of said plurality tapes.

41. The seal of claim 40, wherein said reinforcement further comprises a fine metallic wire having a longitudinal axis that is substantially parallel to a bilateral axis of a tape of said plurality of tapes.

42. The seal of claim 40, wherein said reinforcement further comprises a plastics material or inorganic, fibrous material.

43. The seal of claim 33, further comprising:
   a center core of textile yarn having a knitted, plaited or braided construction.

44. The seal of claim 32, wherein each tape of said plurality of tapes is impregnated with lubricant material.

45. The seal of claim 32, wherein said interlaced plurality of tapes have a generally rectangular cross-sectional shape.

* * * * *